United States Patent
Jaiswal et al.

(10) Patent No.: US 11,238,353 B2
(45) Date of Patent: Feb. 1, 2022

(54) COGNITIVE ENGINE FOR MULTIPLE INTERNET OF THINGS DEVICES

(71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US); Roxana Monge Nunez, Heredia (CR); Clifford A. Pickover, Yorktown Heights, NY (US); Luis G. Solano Enriquez, Cartago (CR)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 15/973,946

(22) Filed: May 8, 2018

(65) Prior Publication Data
US 2019/0347560 A1    Nov. 14, 2019

(51) Int. Cl.
*G06N 5/04*    (2006.01)
*H04L 29/08*    (2006.01)
(Continued)

(52) U.S. Cl.
CPC ............ *G06N 5/04* (2013.01); *G06N 20/00* (2019.01); *H04L 41/14* (2013.01);
(Continued)

(58) Field of Classification Search
CPC .......... G06N 5/04; G06N 20/00; H04L 41/14; H04L 43/0811; H04L 67/12; H04L 67/306
(Continued)

(56) References Cited

U.S. PATENT DOCUMENTS 9,836,055 B1 * 12/2017 Kim ..................... G06F 3/017
2015/0019710 A1   1/2015 Shaashua et al.
(Continued)

FOREIGN PATENT DOCUMENTS

CN    110457569 A    11/2019
WO    2013123445 A1    8/2013

OTHER PUBLICATIONS

Mell et al., "The NIST Definition of Cloud Computing," National Institute of Standards and Technology, Sep. 2011, p. 1-3, Special Publication 800-145.

*Primary Examiner* — Alan S Chou
(74) *Attorney, Agent, or Firm* — Tihon Poltavets

(57) ABSTRACT

A method, computer system, and a computer program product for managing and optimizing connectivity of a plurality of IoT devices based on cognitive learning is provided. The present invention may include identifying a user, wherein a plurality of user context data is stored in a user profile. The present invention may then include detecting a change in at least one current user context associated with the identified user. The present invention may also include performing a connectivity and management analysis on the detected change in the at least one current user context. The present invention may then include generating at least one optimal plan for the plurality of IoT devices associated with the identified user based on the performed connectivity and management analysis. The preset invention may further include performing at least one action based on the generated at least one optimal plan.

20 Claims, 6 Drawing Sheets

(51) Int. Cl.
*H04L 12/24* (2006.01)
*H04L 12/26* (2006.01)
*G06N 20/00* (2019.01)

(52) U.S. Cl.
CPC .......... *H04L 43/0811* (2013.01); *H04L 67/12* (2013.01); *H04L 67/306* (2013.01)

(58) Field of Classification Search
USPC .......................................................... 709/12
See application file for complete search history.

(56) References Cited

U.S. PATENT DOCUMENTS

| | | | |
|---|---|---|---|
| 2015/0227118 A1 | 8/2015 | Wong | |
| 2016/0300049 A1* | 10/2016 | Guedalia | G06F 21/316 |
| 2016/0342906 A1* | 11/2016 | Shaashua | G06N 20/00 |
| 2017/0006141 A1 | 1/2017 | Bhadra | |
| 2017/0235353 A1 | 8/2017 | Mukherjee et al. | |
| 2017/0243128 A1 | 8/2017 | Kishan et al. | |
| 2018/0288161 A1* | 10/2018 | Saxena | H04W 4/33 |
| 2019/0065975 A1* | 2/2019 | White | G06F 7/08 |
| 2019/0258807 A1* | 8/2019 | DiMaggio | G06N 20/00 |
| 2019/0361575 A1* | 11/2019 | Ni | G06F 3/0484 |
| 2020/0274839 A1* | 8/2020 | Loi | H04L 67/22 |
| 2020/0364588 A1* | 11/2020 | Knox | H04L 67/12 |
| 2021/0151195 A1* | 5/2021 | Hayward | G16H 10/20 |

\* cited by examiner

COGNITIVE ENGINE FOR MULTIPLE INTERNET OF THINGS DEVICES

BACKGROUND

The present invention relates generally to the field of computing, and more particularly to cognitive computing.

The quantity of Internet of Things (IoT) devices owned and utilized by a single person is rapidly growing. Each IoT device is utilized according to a specific context. A person, for example, may use a small desktop speaker each day after lunch for a period of two hours but the same person may use a stereo every Sunday morning until noon. Another person may activate a sound bar in a media room and prohibit the use of headphones, when the person launches a specific application on a television. To manually keep track of and operate these IoT devices properly may be inefficient.

SUMMARY

Embodiments of the present invention disclose a method, computer system, and a computer program product for managing and optimizing connectivity of a plurality of IoT devices based on cognitive learning. The present invention may include identifying a user, wherein a plurality of user context data is stored in a user profile, wherein a cognitive engine is utilized to learn a plurality of interactions associated with the identified user and at least one preferred IoT device associated with the user based on the stored plurality of user context data. The present invention may then include detecting a change in at least one current user context associated with the identified user. The present invention may also include performing a connectivity and management analysis on the detected change in the at least one current user context. The present invention may then include generating at least one optimal plan for the plurality of IoT devices associated with the identified user based on the performed connectivity and management analysis, wherein the cognitive engine provides at least one recommendation, at least one adjustment or at least one action to the generated optimal plan associated with the identified user. The preset invention may further include performing at least one action based on the generated at least one optimal plan.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
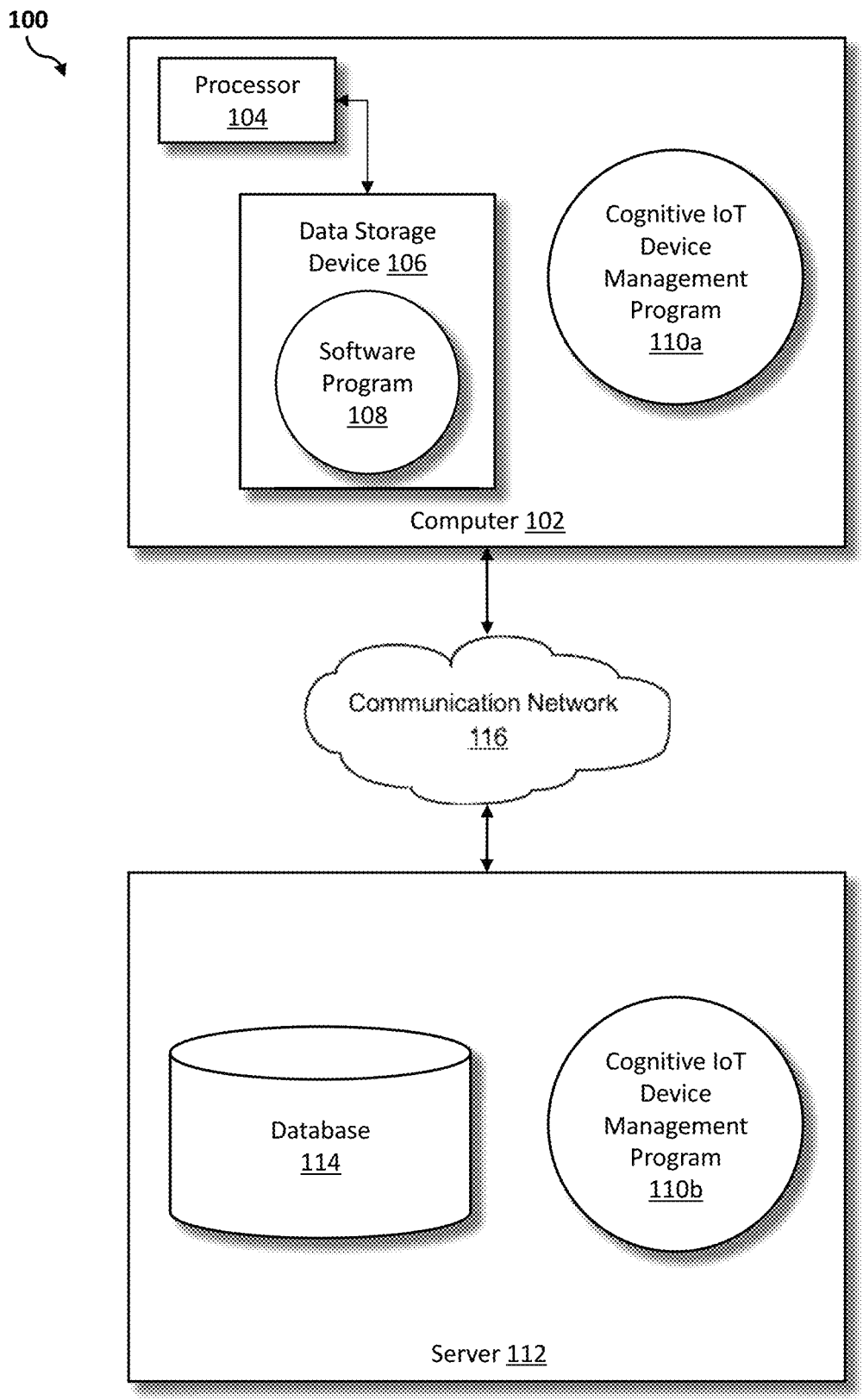
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for managing and optimizing multiple IoT device connectivity based on cognitive learning. As such, the present embodiment has the capacity to improve the technical field of cognitive computing by recommending, adjusting or executing actions based on cognitive learning from the user interactions with preferred IoT devices based on user context. More specifically, the cognitive IoT device management program may access the user profile and data associated with the user from a cognitive learning database, and the cognitive IoT device management program may commence the connectivity and management analysis where user context may be analyzed, preferred IoT devices may be identified and the connectivity and characteristics of the identified IoT devices are identified. The cognitive IoT device management program may then generate an optimal plan for multiple IoT devices to meet the expectations of the user and optimize IoT device management. The cognitive IoT device management program may then execute actions, including recommendations and adjustments, on the IoT devices. Then, the cognitive IoT device management program may monitor the user's reaction to the executed recommendations, adjustments and actions and store the user's reaction in the cognitive learning database for the cognitive IoT device management program to continue to learn the user's preferences.

As previously described, the quantity of Internet of Things (IoT) devices owned and utilized by a single person is rapidly growing. Each IoT device is utilized according to a specific context. To manually keep track of and operate these IoT devices properly may be inefficient.

Therefore, it may be advantageous to, among other things, keep track of IoT devices owned by a single person, and to learn about when and how each IoT device is utilized by the person. The cognitive IoT device management program may execute actions on each IoT device and receive feedback from the person (i.e., user) after execution. The feedback may be utilized to leverage that knowledge in the next cycle (i.e., usage) by the person by recommending, adjusting and executing actions to optimize IoT devices connectivity, as well as execute actions to optimize IoT devices management (e.g., turn on/off the devices to avoid the waste of battery).

According to at least one embodiment, the cognitive IoT device management program may learn the interactions between a user and the multiple IoT devices (e.g., mood of the user, company information) for executing actions accordingly, and may also receive and analyze information representative of cohorts of users to adjust an action on the multiple IoT devices.

According to at least one embodiment, the cognitive IoT device management program may learn how users interact with multiple IoT devices, and based on the learning, the cognitive IoT device management program may recommend, adjust and execute actions to optimize IoT devices connectivity. The cognitive IoT device management program, based on the learning, may execute actions to optimize IoT device management thereby avoiding waste of battery and human intervention. A person, for example, may use a small desktop speaker each day after lunch for a period of two hours but the same person may use a stereo every Sunday morning until noon. Another person may activate a sound bar in a media room and shut down all headphones, when the person launches a specific application on a television. For the previous example, the cognitive IoT device management program may automatically turn on the speakers after lunch and shut off the speakers after two hours. Similarly, the cognitive IoT device management program may automatically turn on the stereo every Sunday morning and shut off the stereo at noon. The cognitive IoT device management program may also turn on the sound bar when the person launches the specific application and automatically turn off the headphones, without human intervention. Besides the simplification of user interaction with the electronic devices, the cognitive IoT device management program may also, for example, reduce electricity usage and cost by deactivating devices that would otherwise be unnecessarily activated.

According to at least one embodiment, the cognitive IoT device management program may learn which IoT devices may be utilized with certain application program interfaces (APIs). User A, for example, uses the cognitive IoT device management program to watch movies using a home theater. As such, when User A logs in to a popular API to access a movie, the cognitive IoT device management program may turn off certain IoT devices (e.g., speakers, headphones) that are not necessary at this moment.

According to at least one embodiment, the cognitive IoT device management program may learn which locations the IoT devices are often utilized in. If User A, for example, is in the office, even though User A turns on a speaker, the cognitive IoT device management program will use the headphones as the first option, since User A does not generally utilize the speaker in the office.

According to at least one embodiment, the cognitive IoT device management program may learn in which context and time the user prefers to utilize each IoT device. For example, User A uses speakers each morning while performing household chores.

According to at least one embodiment, the cognitive IoT device management program may be connected with other devices (e.g., camera) for receiving inputs related to the user's company, mood, location, and emotional status. In another embodiment, the cognitive IoT device management program may identify which IoT device may be utilized based on the user's characteristics.

The present embodiment may include inputs associated with the user's profile (e.g., age, nationality, gender) and user context (e.g., activity, company, time of the day). The user profile may also include user data associated with historical context and user characteristics. Additionally, the user context may include a group of characteristics and/or scenarios to which the user reacts or uses IoT devices, such as applications.

According to at least one embodiment, the cognitive IoT device management program may include a connectivity and management assessment in which the cognitive IoT device management program analyzes the user context and identifies which IoT devices are preferred to be used by the user. The cognitive IoT device management program may validate IoT device's connectivity and characteristics (e.g., battery use, availability).

According to at least one embodiment, the cognitive IoT device management program may include an optimal plan for multiple IoT devices. The cognitive IoT device management program may run an optimal plan for meeting the user's expectations based on the context and for optimizing IoT device management (e.g., saving battery). The present embodiment may include generating and executing the recommendations, adjustments and actions, and may continue to learn based on how the user reacts to these recommendations, adjustments and actions.

According to at least one embodiment, the cognitive IoT device management program may learn that the user prefers minimal (if any) notification (e.g., cancel the established tone for a specific application or messaging service) during a specific user context. For example, if User A is using speakers for listening to music, then the cognitive IoT device management program may cancel the sound for that specific application or messaging service. On the other hand, if User B prefers to be notified, even if music streaming is interrupted, then the cognitive IoT device management program will continue to notify User B accordingly.

According to at least one embodiment, the cognitive IoT device management program may analyze the IoT devices being used by people who are nearby and recommend to the user to not use a certain device that the user has chosen if that IoT device may be socially unacceptable or inappropriate at the current time or location. For example, if User C is an area where everyone has deactivated or turned off their cell phone, but User C has chosen to increase the volume of User C's cell phone, then the cognitive IoT device management program will recommend against increasing the volume on User C's cell phone.

According to at least one embodiment, the cognitive IoT device management program may determine which IoT device to use for playback (when more than one IoT device is available), and the settings and controls associated with the IoT devices used during playback based on: (1) purpose of the multimedia content (e.g., for multiple listeners, party setting, privacy settings, to create a certain mood); (2) frequency characteristics of the multimedia content (e.g., the distribution of amplitudes at different frequencies in a song); (3) specifications of the artist (e.g., based on the musician, group or producer, estimates on how the content sounds if played on certain IoT devices or with certain device settings) where the cognitive IoT device management program may transmit the artist specification as metadata, along with the song; and (4) current mood of the user (e.g., determined by user biometrics, time of the day). In the present embodiment, the device settings/controls may include frequency equalization, delay, reverb, tempo change, relative speaker volume, bass boot, low and high pass filters, notch filter, flange and chorus effect, and parametric equalization effect.

According to at least one embodiment, the cognitive IoT device management program may determine information associated with the multimedia content (e.g., party settings and privacy settings) and user context by utilizing at least one entry from an electronic calendar (or APIs associated with determining, categorizing or organizing calendar entries) associated with the user (i.e., user calendar). The cognitive IoT device management program may obtain permission from the user to access one or more forms of data associated with the user electronic calendar. For example, a module accesses a calendar note for an entry that indicates that the user will be attending a party later that day after work. The calendar entry will be utilized to create a mood for the user prior to the party, which includes playing popular dance music one hour before the start time of the party.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cognitive IoT device management program 110a. The networked computer environment 100 may also include a server 112 that is enabled to run a cognitive IoT device management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cognitive IoT device management program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the cognitive IoT device management program 110a, 110b (respectively) to manage and optimize multiple IoT device connectivity based on cognitive learning. The cognitive IoT device management method is explained in more detail below with respect to FIGS. 2 and 3.

Figure 2:
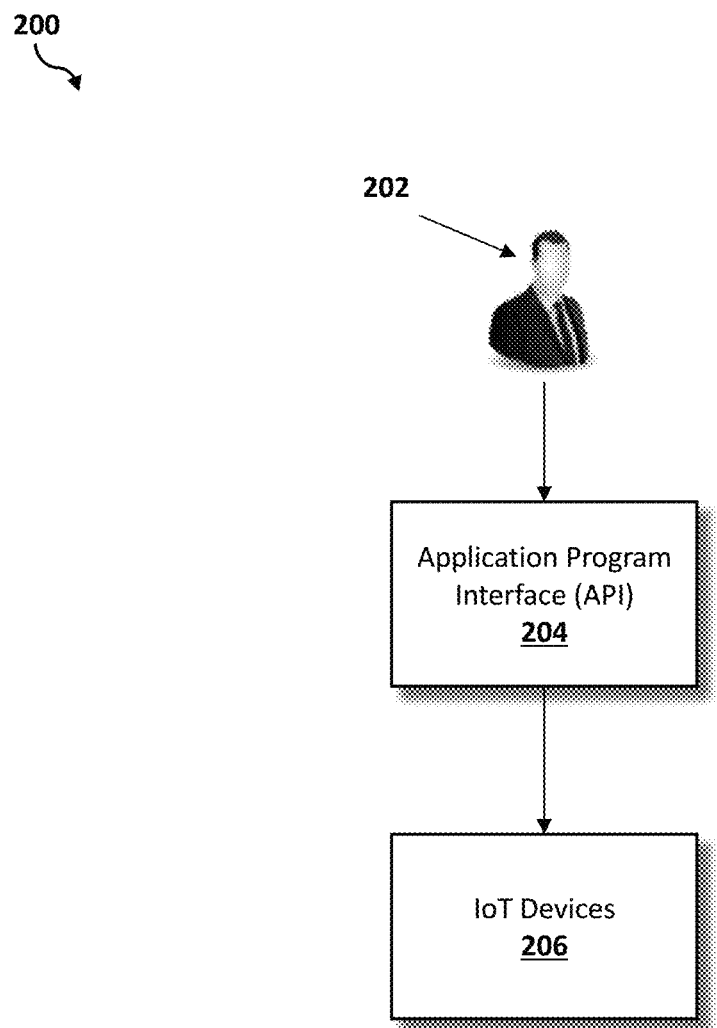
FIG. 2 illustrates a user profile connection environment according to at least one embodiment.

Referring now to FIG. 2, an exemplary user profile connection environment 200 in accordance with one embodiment depicted. As shown, each user of the cognitive IoT device management program 110a, 110b is identified by a user profile 202. The user profile 202 may be associated with at least one application program interface (API) 204, which may be associated with at least one Internet of Things (IoT) device 206 (i.e., the interconnection via the Internet of computing devices embedded in everyday objects, enabling them to send and receive data).

When setting up the user profile 202, the user may include APIs 204 and the corresponding IoT devices 206. The cognitive IoT device management program 110a, 110b may utilize a computer display monitor to display the main screen for the cognitive IoT device management program 110a, 110b. On the main screen, there may be a "Criteria" button located at the bottom right side of the screen. Once the user clicks on the "Criteria" button, the user may be prompted (e.g., via dialog box) to confirm the identification of the user. If no username has been created that is associated with the cognitive IoT device management program 110a, 110b, then the user may be automatically prompted (e.g., via another dialog box) to login or set up a user profile 202. The user may login by entering the username associated with the user in the dialog box, for example, in a blank comment box labeled "Username" and select the "Submit" button at the bottom of the dialog box.

If, however, a username has been created that is associated with the cognitive IoT device management program 110a, 110b, then the last used username may be presented at the top of the dialog box, with "Yes" or "No" buttons underneath. If the user's username matches the name presented in the dialog box, the user selects the "Yes" button and the cognitive IoT device management program 110a, 110b retrieves the user profile 202. Alternatively, if the username does not match, then the user may click the "No" button and another dialog box may appear for the user to enter the username for the cognitive IoT device management program 110a, 110b to retrieve the user profile 202. If the user is first-time user, then, according to at least one implementation, the user, for example, may click the "First-Time User" button located to the left of the "Submit" button in the second dialog box.

The user may then be prompted (e.g., via another dialog box) to create a user profile 202 with the user's characteristics. The dialog box may include, for example, a list of options associated with the user profile 202, the list may include "IoT Devices Set-Up." The user may select the button located to the left of "IoT Devices Set-Up," and the dialog box may expand to include two text boxes with a "Submit" button and "Additional IoT Device" button at the bottom of the dialog box. On top of the first text box may be the text "IoT Devices" with a "Browse" button located to the right of the box. As such, the user may manually enter the name of the IoT Device 206 into the top box, or click the "Browse" button which may prompt the user (e.g., via another dialog box) to search for the IoT device 206. The IoT device 206 may be located via communications network 116. Once the IoT device 206 is located, then the second box may include a list of APIs 204 that are associated with the above selected IoT device 206. The user may click on at least one API 204 associated with the IoT device 206. Once the user is finished with that IoT device 206, the user may either click the "Submit" button or the "Additional IoT Device" button. If the user clicks the "Submit" button, then the selected IoT device 206 and corresponding APIs 204 may be saved to the user profile 202 and the dialog box may disappear. If, however, the user clicks the "Additional IoT Device" button, then the user may be prompted (e.g., via another dialog box) to add an additional IoT device 206 and corresponding APIs 204.

In another embodiment, the user may select the "Display" button after the "Criteria" button is selected on the main screen. Once the user selects the "Display" button, the user may be presented with a list of the IoT Devices 206 and corresponding APIs 204 connected to the user profile 202. Additionally, the user may be able to view the connectivity and characteristics (e.g., availability, battery) associated with each IoT device 206 by clicking on the specific IoT device 206 as listed, for example, in the dialog box. If the selected IoT Device 206 is not functioning properly, then the cognitive IoT device management program 110a, 110b may indicate that the IoT device 206 is malfunctioning and may provide reasons for the malfunction (including reasons associated with the corresponding APIs 204).

In addition to IoT devices 206, the user may include personal characteristics (e.g., name, nickname, photographs or icon, age, nationality, gender, interests) into the user profile 202 by clicking the "Personal Information" button listed with the other options (e.g., "IoT Device Set-Up") associated with the user profile 202. A template of the user profile 202 may appear, and the user may click on the appropriate sections to add, modify, upload or create information (or digital image for photograph or icon) pertaining to that section of the user profile 202.

Figure 3:
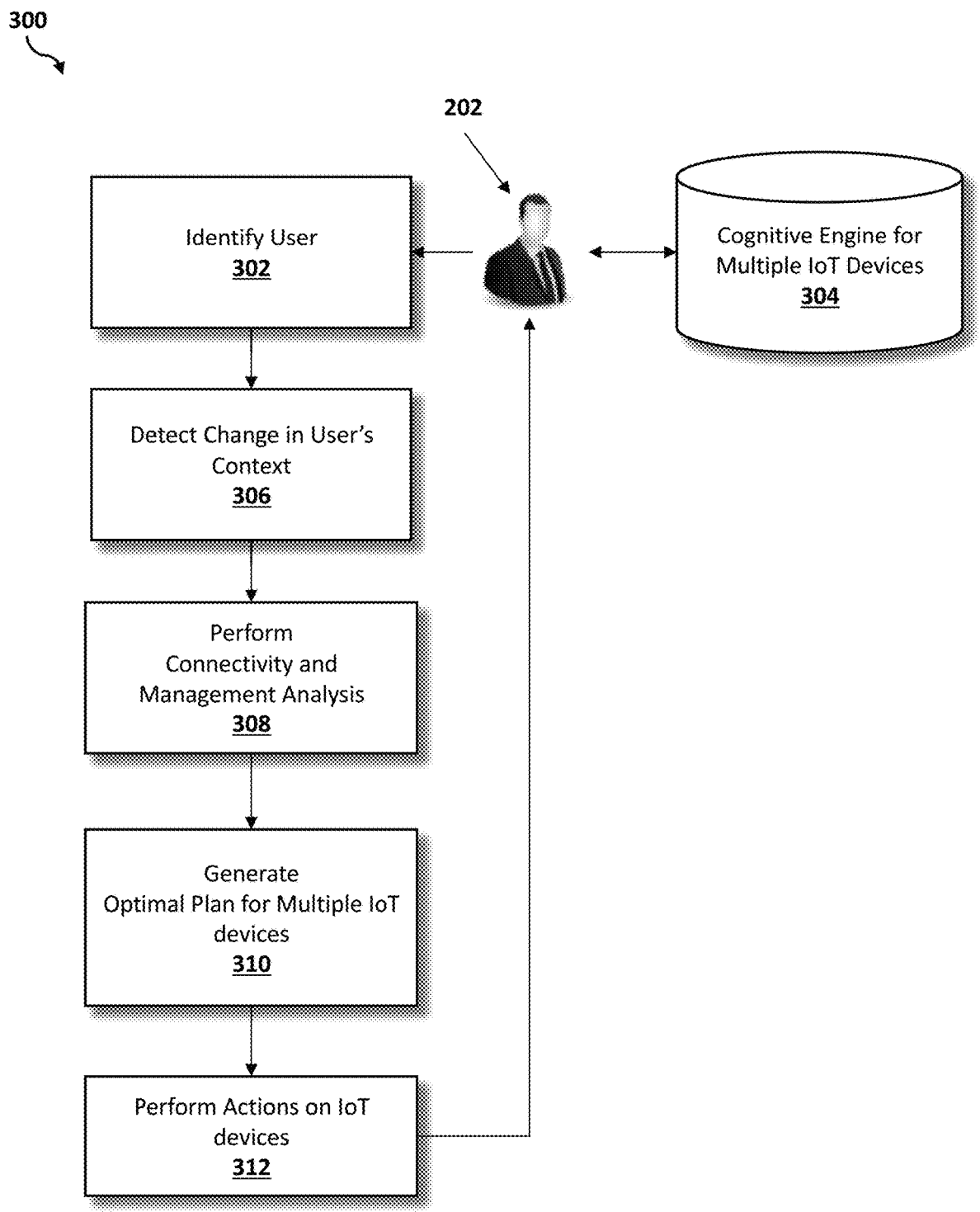
FIG. 3 is an operational flowchart illustrating a process for managing and optimizing multiple IoT devices according to at least one embodiment.

Referring now to FIG. 3, an operational flowchart illustrating the exemplary multiple IoT device management and optimization process 300 used by the cognitive IoT device management program 110a, 110b according to at least one embodiment is depicted.

At 302, a user is identified based on a user profile 202. A user may be identified by the cognitive IoT device management program 110a, 110b, when the user logs into a user profile 202 (e.g., a database 114 or file for saving data associated with a user, such as historical context and user's characteristics for optimizing and managing multiple Internet of Things (IoT) devices 206 associated with the user based on cognitive learning). The cognitive IoT device management program 110a, 110b may identify the user by prompting the user (e.g., via dialog box) to provide the username associated with the user. The dialog box, for example, may include a comment "Username" with a blank comment box to the right. Once the user enters the username associated with the user, the user may select the "Submit" button located below.

If, however, the user is first-time user, then, according to at least one implementation, the user, for example, may click the "First-Time User" button located to the left of the "Submit" button in the dialog box. The user may then be prompted (e.g., via dialog box) to create a user profile 202 with the user's characteristics (e.g., name, age, gender, nationality, interests and IoT devices 206 with corresponding APIs 204). Once the user finishes setting up the user profile 202, then the user may click the "Finish" button located on the bottom of the dialog box. The created user profile 202 may then be stored on a separate database 114 associated with the cognitive IoT device management program 110a, 110b. Each time that the user logs into the cognitive IoT device management program 110a, 110b with the user's username, the generated user data (e.g., user's characteristics) may be saved on that separate database 114 associated with the cognitive IoT device management program 110a, 110b. Additionally, the user profile 202 may be created, modified or updated by the user or service providers.

The user profile 202 may be associated with a cognitive engine for multiple IoT devices 304 (e.g., a database 114), which may learn the user's patterns (i.e., interaction with user and IoT devices associated with the user) based on the user context (i.e., a group of characteristics and/or scenarios to which the user reacts or utilizes Internet of Things (IoT) devices 206 (e.g., applications, IoT device availability, time of day, company, location, emotional status of user)). Based on the user context (i.e., user's context or user context data), the cognitive IoT device management program 110a, 110b may utilize the cognitive engine for multiple IoT devices 304 (i.e., cognitive engine 304) to recommend, adjust or execute actions on IoT devices 206.

Additionally, the cognitive engine for multiple IoT devices 304 and the user profile 202 may recollect data associated with the user and the context associated with the user to continue to learn the reactions and preferences associated with the user, which may change over time.

For example, the user is a return user. Therefore, the user enters the username "RUGBYGENE519" and clicks the "Submit" button.

In another embodiment, the user may be identified prior to changing any of the criteria or settings in the cognitive IoT device management program 110a, 110b. On the main screen for the cognitive IoT device management program 110a, 110b, there may be a "Criteria" button located at the bottom right side of the screen. Once the user clicks on the "Criteria" button, the user may be prompted (e.g., via dialog box) to confirm the identification of the user. The username is presented at the top of the dialog box, with "Yes" or "No" buttons underneath. If the user's username matches the name presented in the dialog box, the user selects the "Yes" button and the cognitive IoT device management program 110a, 110b retrieves the user profile 202. If, however, the usernames do not match, then the user may click the "No" button and another dialog box may appear for the user to include the username for the cognitive IoT device management program 110a, 110b to retrieve the user profile 202.

Then, at 306, a change in the user context is detected. Using a software program 108 on the user device (e.g., user's computer 102), user context may be received as input, from a biometric detection device (e.g., watch, glasses, applications associated with a portable user device) to the cognitive IoT device management program 110a, 110b via communications network 116. The cognitive IoT device management program 110a, 110b may utilize biometric detection (i.e., network of physical devices, vehicles, home appliances and other items embedded with electronics, software, sensors, actuators and network connectivity which enables these objects to connect and exchange data related to the user) to detect and monitor the user context, and receive inputs associated with the user context, such as company, mood, emotional status and location (i.e., current user context). For the user's location, the cognitive IoT device management program 110a, 110b may utilize wearable biometric sensors associated with the physiological recognition (e.g., face, hand, iris and fingerprint) and behavioral recognition (e.g., voice, heartbeat rate, breathing rate). For the user's mood and emotional status, the cognitive IoT device management program 110a, 110b may utilize wearable biometric sensors associated with recognizing hand gestures and handwriting, as well as utilize recent social media posts associated with the user or by the user. For user's current location, current time of day, weather (i.e., weather data) and date (or day of the week), the cognitive IoT device management program 110a, 110b may utilize wearable accelerometer and gyroscope sensors and application program interfaces (APIs), global positioning service (GPS), recent social media posts associated with the user or by the user, and weather data tracking services on the portable user device. Using biometric detection, the cognitive IoT device management program 110a, 110b may be able to detect a change in the user context.

Continuing the previous example, the user "RUGBYGENE519" is wearing a watch with biometric sensors. Around 8:30 am on Saturday, the user wakes up and eats breakfast. Then, at 9 am, the biometric sensors associated with the watch determine that the heart rate associated with the user is elevated, and the cameras located throughout the house determine that the user has started the user's household chores earlier than usual. In the past, the user has begun household chores at 10 am on Saturday morning.

In the present embodiment, if the cognitive IoT device management program 110a, 110b is unable to detect and continue to monitor the user context, then the cognitive IoT device management program 110a, 110b may present an error message, guide the user to activate (i.e., turn on) a specific API, GPS or data tracking service, or present the identified malfunction (e.g., reason for the failure to detect) to the user. The cognitive IoT device management program 110a, 110b may then continue to attempt to detect and monitor user context until the cognitive IoT device management program 110a, 110b receives the adequate data on user context.

Then, at 308, a connectivity and management analysis is performed. The cognitive IoT device management program 110a, 110b may utilize a connectivity and management analysis of the detected change in the user context (i.e., current user context) to determine the connectivity of various IoT devices and to identify the preferences of the user (i.e., preferred IoT devices) based on the analyzed change in the user context. The cognitive IoT device management program 110a, 110b may perform a connectivity assessment in which the cognitive IoT device management program 110a, 110b may validate that multiple IoT devices are connected and able to function properly based on availability (e.g., in working order, and whether the IoT device is activated or turned off), battery life and location of the multiple IoT devices (e.g., whether the location of the speakers are too far away from the user thereby rendering the use of the speakers of minimal or no use to the user). The cognitive IoT device management program 110a, 110b may simultaneously perform an IoT devices management assessment in which the user context is analyzed and the IoT devices that are preferred by the user are identified.

Continuing the previous example, the cognitive IoT device management program 110a, 110b performs an IoT devices management assessment to analyze the detected change in the user's heart rate and the activity of the user. Based on the historical user context from the user profile 202, the user utilizes the speakers located in the living room, dining room, kitchen and one of the bedrooms to listen to various news stations, while the user is performing household chores. The user also turns on the lights in the hall near the supply closet, where the cleaning supplies are located, for spot light illumination while performing the household chores. The cognitive IoT device management program 110a, 110b then performs a connectivity assessment to determine that the speakers in the living room, dining room, kitchen and bedrooms are at 75% to 100% battery life, and are functioning properly.

In another embodiment, the cognitive IoT device management program 110a, 110b may perform the connectivity assessment and IoT devices management assessment consecutively. For example, the cognitive IoT device management program 110a, 110b may perform the connectivity assessment before the cognitive IoT device management program 110a, 110b may perform the IoT devices management assessment, or the cognitive IoT device management program 110a, 110b may perform the IoT devices management assessment before the cognitive IoT device management program 110a, 110b may perform connectivity assessment.

Then, at 310, an optimal plan for multiple IoT devices is generated. Based on the data generated from the connectivity and management analysis and the detected change to the user context, the cognitive IoT device management program 110a, 110b may run an optimal plan for meeting the user's expectations. The user's expectations may be based on the data associated with historical context and user characteristics in the user profile 202 that was generated by the cognitive engine for multiple IoT devices 304. The cognitive IoT device management program 110a, 110b may further utilize the optimal plan to optimize IoT device management. The optimal plan may include recommendations and adjustments (e.g., changes to multiple IoT devices such as turn on/off, save battery, turning the volume up or down and other IoT device actions) to the current actions performed by IoT devices to meet the user's expectations based on the detected change in user context.

Continuing the previous example, the cognitive IoT device management program 110a, 110b generates an optimal plan to turn on the speakers located in the living room, dining room, kitchen and master bedroom to a national news station. The cognitive IoT device management program 110a, 110b also adjusts the line lights and back lights are turned on, in addition to the spot lights, in the hall near the supply closet since the weather is overcast with no sunlight and the time of day is earlier than when the user normally performs household chores.

Then, at 312, at least one action associated with the IoT devices is executed. The cognitive IoT device management program 110a, 110b may execute the actions included in the generated optimal plan. The cognitive IoT device management program 110a, 110b may also monitor the user's reactions to the executed actions. The monitored user's reactions may serve as automatic user feedback to the cognitive IoT device management program 110a, 110b. Using a software program 108 on the user device (e.g., user's computer 102), the user's reaction may be received as input, from a biometric detection device (e.g., watch, glasses, applications associated with a portable user device) to the user profile 202 associated with the cognitive IoT device management program 110a, 110b via communications network 116. The cognitive engine for multiple IoT devices 304 may then learn from the automatic user feedback (i.e., user reaction data) as to whether the executed action met the user's expectations.

Continuing the previous example, the cognitive IoT device management program 110a, 110b executed the actions included in the optimal plan. The speakers located in the living room, dining room, kitchen and master bedroom are turned on to broadcast a national news station, and the cognitive IoT device management program 110a, 110b turns on the spot, line and back lights in the hall near the supply closet.

In the present embodiment, if the cognitive engine for multiple IoT devices 304 determines that the executed action at 312 failed to meet the user's expectation, the cognitive IoT device management program 110a, 110b may return to previous actions performed by the cognitive IoT device management program 110a, 110b. For example, if the biometric device associated with the user determines that the user starts to cry when the cognitive IoT device management program 110a, 110b changes the listening music to an alternative rock song, then the cognitive engine for multiple IoT devices 304 may determine that the user exhibited a negative reaction to the executed action of changing the music to an alternative rock song and return to playing the previously played music.

In another embodiment, the cognitive IoT device management program 110a, 110b may store the learned user reactions in a database (e.g., database 114).

In another embodiment, the user may provide manual user feedback to the cognitive IoT device management program 110a, 110b by changing the executed action. For example, if the user turns off the music streaming device, when the cognitive IoT device management program 110a, 110b changed the listening music to an alternative rock song, then the cognitive engine for multiple IoT devices 304 may determine that the user exhibited a negative reaction to the executed action of changing the music to an alternative rock song. The cognitive engine for multiple IoT devices 304 may learn from this user reaction and modify the user's pattern for user interaction with a specific IoT device based on the user context.

In another embodiment, the cognitive engine for multiple IoT devices 304 may learn based on the cohorts of users (e.g., classes of users with certain preferences or characteristics). As such, based on whether the user may be affiliated with a specific class or group as indicated in the user profile 202, or has a certain characteristic (e.g., a specific time that the user turns on an IoT device, what an IoT device is used for, which IoT device is used during a given time of day, and other user habits and usage patterns associated with at least one IoT device), the cognitive engine for multiple IoT devices 304 may learn the user's pattern of interaction with IoT devices. The cognitive IoT device management program 110a, 110b may learn how people with similar profiles interact with the IoT devices, for example, teenagers may feel more comfortable using several IoT devices in a short period based on their context. On the other hand, older adults may prefer to use one or two devices only. Furthermore, the cognitive IoT device management program 110a, 110b may learn that teenagers prefer devices with X characteristics in a specific context rather than older adults who prefer devices with Y characteristics.

In another embodiment, new IoT devices may be added or considered in the cognitive engine for multiple IoT devices 304 for adjusting actions on multiple IoT devices. As such, the cognitive IoT device management program 110a, 110b may provide a function to include more varied types of IoT devices to the user profile 202 for a seamless integration. For example, when the user buys a new IoT device, then the new IoT device may be added to cognitive IoT device management program 110a, 110b.

In another embodiment, if another person temporarily brings another IoT device to the user's location, the other IoT device may be temporarily added into the cognitive IoT device management program 110a, 110b. For example, if the user's friend brings a speaker, which includes better features than the user's speakers, then the friend's speaker will be added into the cognitive IoT device management program 110a, 110b. Additionally, the cognitive IoT device management program 110a, 110b will learn that the user prefers to use the friend's speakers rather than the user's speakers when the friend's speakers are present. As such, when the friend's speakers are connected to the cognitive IoT device management program 110a, 110b, the friend's speakers will be utilized instead of the user's speakers.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
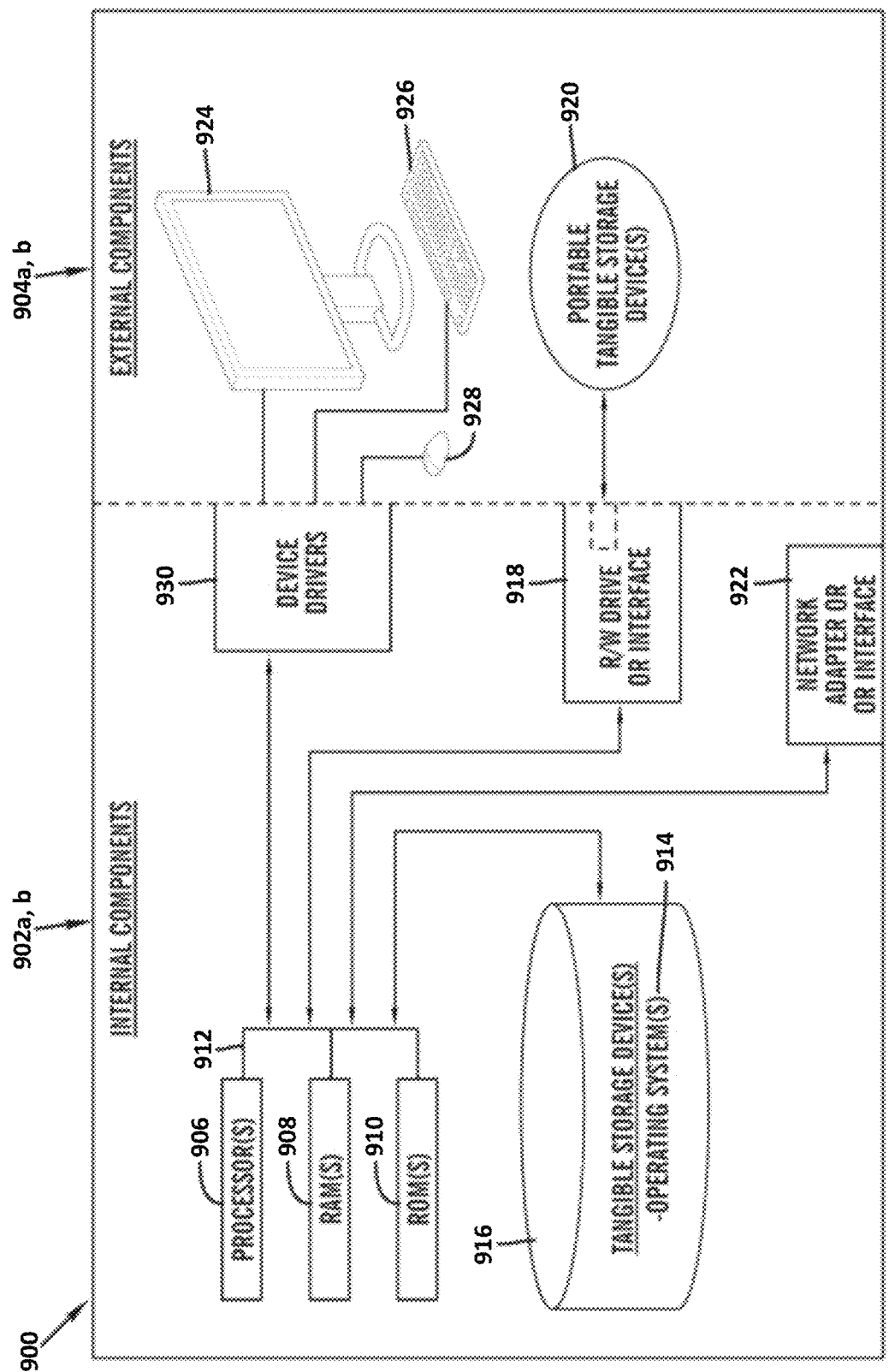
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the cognitive IoT device management program 110a in client computer 102, and the cognitive IoT device management program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cognitive IoT device management program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the cognitive IoT device management program 110a in client computer 102 and the cognitive IoT device management program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cognitive IoT device management program 110a in client computer 102 and the cognitive IoT device management program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
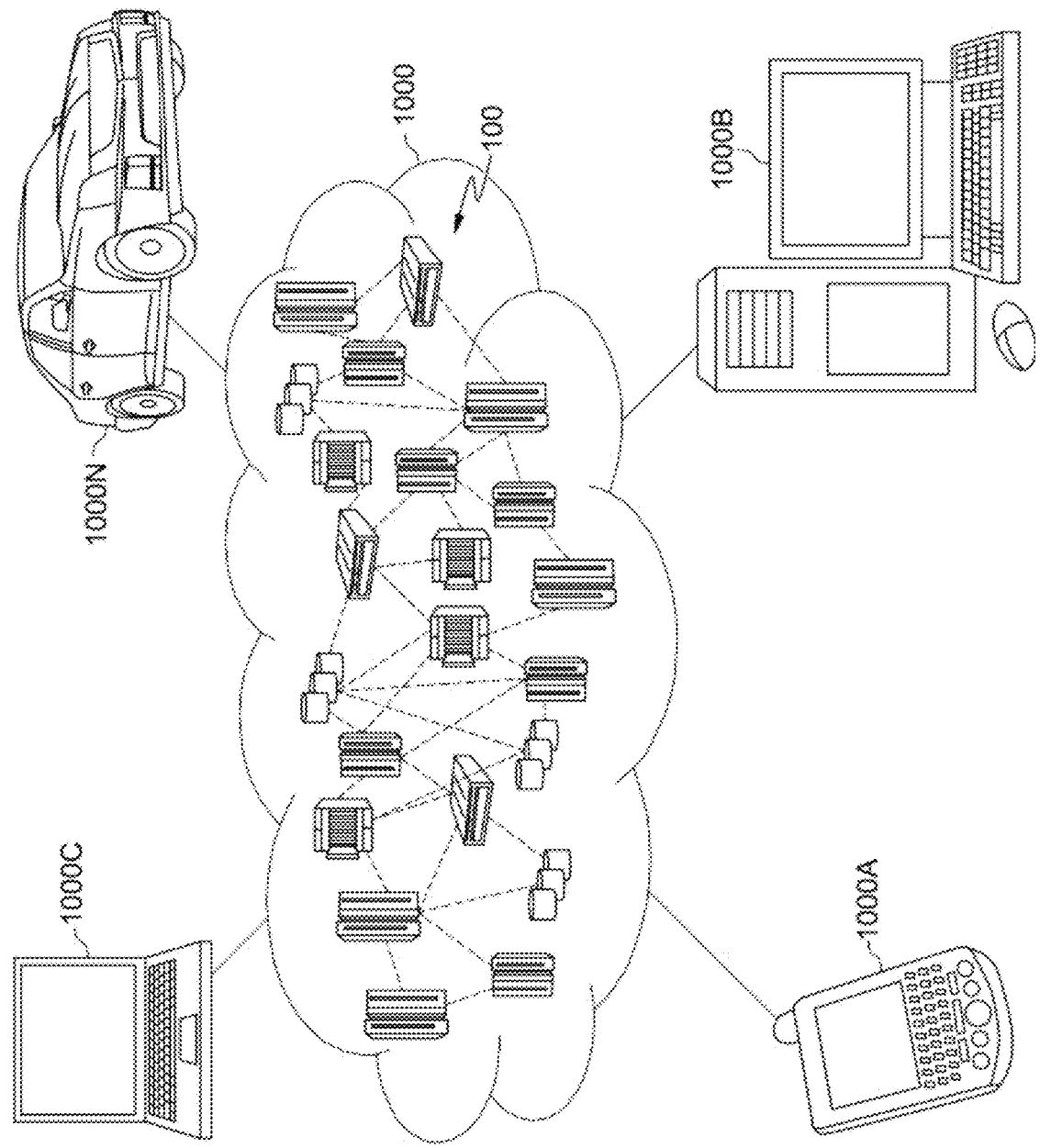
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
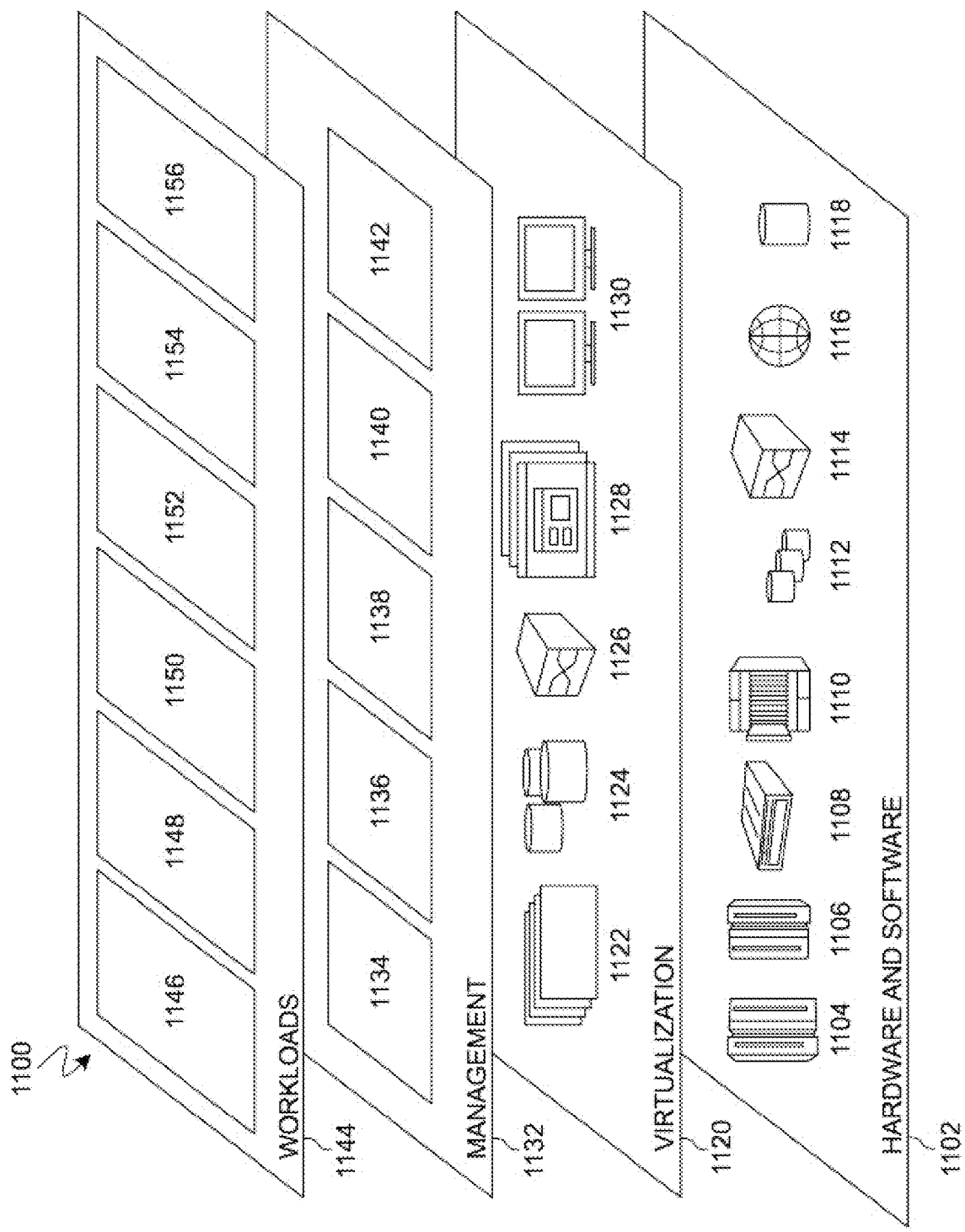
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and cognitive IoT device management 1156. A cognitive IoT device management program 110a, 110b provides a way to manage and optimize multiple IoT device connectivity based on cognitive learning.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing and optimizing connectivity of a plurality of IoT devices based on cognitive learning, the method comprising:

identifying a user, wherein a plurality of user context data is stored in a user profile, wherein a cognitive engine is utilized to learn a plurality of interactions associated with the identified user and at least one preferred IoT device associated with the user based on the stored plurality of user context data;

detecting a change in at least one current user context associated with the identified user;

performing a connectivity and management analysis on the detected change in the at least one current user context;

generating at least one optimal plan for the plurality of IoT devices associated with the identified user based on the performed connectivity and management analysis, wherein the cognitive engine provides at least one recommendation, at least one adjustment or at least one action to the generated optimal plan associated with the identified user;

performing at least one action based on the generated at least one optimal plan; and responsive to receiving a user's reaction as an input from a biometric detection device for the at least one action, determining the at least one action met a user's expectation based on the user's reaction from the biometric detection device.

2. The method of claim 1, further comprising:

receiving a plurality of user reaction data to the performed at least one action;

analyzing, by the cognitive engine, the received plurality of user reaction data; and storing the analyzed plurality of user reaction data in the user profile.

3. The method of claim 1, wherein performing the connectivity and management analysis on the detected change in the at least one current user context, further comprises:

analyzing the detected change in the at least one current user context;

identifying a plurality of preferred IoT devices to be utilized by the identified user based on the analyzed change in each of the current user context; and validating a connectivity for each identified plurality of preferred IoT devices and a plurality of characteristics associated with each preferred IoT device within the identified plurality of preferred IoT devices.

4. The method of claim 1 in which the user context includes a user activity, a user mood, a user emotional status, a user location, a user company, a time of day, a plurality of weather data and a date.

5. The method of claim 4, wherein detecting the change in at least one current user context associated with the identified user, further comprises:
utilizing a plurality of biometric devices and a plurality of biometric sensors associated with the user mood, the user emotional status and the user activity.

6. The method of claim 4, wherein detecting the change in at least one current user context associated with the identified user, further comprises:
utilizing a plurality of social media posts, a plurality of application program interfaces, and a plurality of data tracking services associated with the user location, the time of day, the date and the plurality of weather data associated with the identified user.

7. The method of claim 1, further comprising:
associating the user profile with an IoT device and at least one corresponding application program interface.

8. The method of claim 2 in which the cognitive engine analyzes and learns based on a cohort of users.

9. A computer system for managing and optimizing connectivity of a plurality of IoT devices based on cognitive learning, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying a user, wherein a plurality of user context data is stored in a user profile, wherein a cognitive engine is utilized to learn a plurality of interactions associated with the identified user and at least one preferred IoT device associated with the user based on the stored plurality of user context data;
detecting a change in at least one current user context associated with the identified user;
performing a connectivity and management analysis on the detected change in the at least one current user context;
generating at least one optimal plan for the plurality of IoT devices associated with the identified user based on the performed connectivity and management analysis, wherein the cognitive engine provides at least one recommendation, at least one adjustment or at least one action to the generated optimal plan associated with the identified user;
performing at least one action based on the generated at least one optimal plan; and
responsive to receiving a user's reaction as an input from a biometric detection device for the at least one action, determining the at least one action met a user's expectation based on the user's reaction from the biometric detection device.

10. The computer system of claim 9, further comprising:
receiving a plurality of user reaction data to the performed at least one action;
analyzing, by the cognitive engine, the received plurality of user reaction data; and
storing the analyzed plurality of user reaction data in the user profile.

11. The computer system of claim 9, wherein performing the connectivity and management analysis on the detected change in the at least one current user context, further comprises:
analyzing the detected change in the at least one current user context;
identifying a plurality of preferred IoT devices to be utilized by the identified user based on the analyzed change in each of the current user context; and
validating a connectivity for each identified plurality of preferred IoT devices and a plurality of characteristics associated with each preferred IoT device within the identified plurality of preferred IoT devices.

12. The computer system of claim 9 in which the user context includes a user activity, a user mood, a user emotional status, a user location, a user company, a time of day, a plurality of weather data and a date.

13. The computer system of claim 12, wherein detecting the change in at least one current user context associated with the identified user, further comprises:
utilizing a plurality of biometric devices and a plurality of biometric sensors associated with the user mood, the user emotional status and the user activity.

14. The computer system of claim 12, wherein detecting the change in at least one current user context associated with the identified user, further comprises:
utilizing a plurality of social media posts, a plurality of application program interfaces, and a plurality of data tracking services associated with the user location, the time of day, the date and the plurality of weather data associated with the identified user.

15. The computer system of claim 9, further comprising:
associating the user profile with an IoT device and at least one corresponding application program interface.

16. The computer system of claim 10 in which the cognitive engine analyzes and learns based on a cohort of users.

17. A computer program product for managing and optimizing connectivity of a plurality of IoT devices based on cognitive learning, comprising:
one or more computer-readable storage media and program instructions stored on at least one of the one or more tangible storage media, the program instructions executable by a processor to cause the processor to perform a method comprising:
identifying a user, wherein a plurality of user context data is stored in a user profile, wherein a cognitive engine is utilized to learn a plurality of interactions associated with the identified user and at least one preferred IoT device associated with the user based on the stored plurality of user context data;
detecting a change in at least one current user context associated with the identified user;
performing a connectivity and management analysis on the detected change in the at least one current user context;
generating at least one optimal plan for the plurality of IoT devices associated with the identified user based on the performed connectivity and management analysis, wherein the cognitive engine provides at least one recommendation, at least one adjustment or at least one action to the generated optimal plan associated with the identified user;

performing at least one action based on the generated at least one optimal plan; and responsive to receiving a user's reaction as an input from a biometric detection device for the at least one action, determining the at least one action met a user's expectation based on the user's reaction from the biometric detection device.

18. The computer program product of claim 17, further comprising:

receiving a plurality of user reaction data to the performed at least one action;

analyzing, by the cognitive engine, the received plurality of user reaction data; and storing the analyzed plurality of user reaction data in the user profile.

19. The computer program product of claim 17, wherein performing the connectivity and management analysis on the detected change in the at least one current user context, further comprises:

analyzing the detected change in the at least one current user context;

identifying a plurality of preferred IoT devices to be utilized by the identified user based on the analyzed change in each of the current user context; and validating a connectivity for each identified plurality of preferred IoT devices and a plurality of characteristics associated with each preferred IoT device within the identified plurality of preferred IoT devices.

20. The computer program product of claim 17 in which the user context includes a user activity, a user mood, a user emotional status, a user location, a user company, a time of day, a plurality of weather data and a date.

* * * * *